United States Patent
Matsukawa et al.

(10) Patent No.: US 7,785,424 B2
(45) Date of Patent: Aug. 31, 2010

(54) METHOD OF MAKING A MAGNETIC CORE PART

(75) Inventors: Kiyotaka Matsukawa, Neyagawa (JP); Kozo Ishihara, Hirakata (JP); Kazuo Ishikawa, Neyagawa (JP); Tomohiro Toyoda, Neyagawa (JP); Toshikazu Tanaka, Neyagawa (JP)

(73) Assignee: Nippon Kagaku Yakin Co., Ltd., Osaka (JP)

( * ) Notice: Subject to any disclaimer, the term of this patent is extended or adjusted under 35 U.S.C. 154(b) by 699 days.

(21) Appl. No.: 11/660,702

(22) PCT Filed: Aug. 23, 2005

(86) PCT No.: PCT/JP2005/015279
§ 371 (c)(1),
(2), (4) Date: Feb. 21, 2007

(87) PCT Pub. No.: WO2006/022262
PCT Pub. Date: Mar. 2, 2006

(65) Prior Publication Data
US 2007/0256759 A1    Nov. 8, 2007

(30) Foreign Application Priority Data
Aug. 23, 2004    (JP) .............................. 2004-242295

(51) Int. Cl.
*H01F 1/14* (2006.01)
(52) U.S. Cl. .......................... 148/104; 419/64; 419/65; 419/66

(58) Field of Classification Search ....................... None
See application file for complete search history.

(56) References Cited

U.S. PATENT DOCUMENTS

| 5,583,475 | A | 12/1996 | Raholijaona et al. |
| 5,604,573 | A * | 2/1997 | Endo et al. ................... 399/55 |
| 6,925,893 | B2 * | 8/2005 | Abe et al. .............. 73/862.332 |
| 2002/0021199 | A1 * | 2/2002 | Serino et al. ............. 336/84 M |
| 2005/0278937 | A1 * | 12/2005 | Du et al. ....................... 29/598 |
| 2007/0256759 | A1 * | 11/2007 | Matsukawa et al. ......... 148/101 |

FOREIGN PATENT DOCUMENTS

| JP | 50-133453 | 10/1975 |
| JP | 54-050922 | 4/1979 |
| JP | 54-163354 | 12/1979 |
| JP | 63-196018 | 8/1988 |
| JP | 2-244704 | 9/1990 |
| JP | 5-315176 | 11/1993 |
| JP | 8-37123 | 2/1996 |
| JP | 8-111339 | 4/1996 |
| JP | 10-257701 | 9/1998 |
| JP | 2003-309024 | 10/2003 |

* cited by examiner

*Primary Examiner*—John P Sheehan
(74) *Attorney, Agent, or Firm*—Wenderoth, Lind & Ponack, L.L.P.

(57) ABSTRACT

Magnetic powder contained in a resin composition for use in injection molding is coated with an insulating material, and a soft magnetic green compact or a hard magnetic green compact is insert molded into the resin composition. Increased magnetic flux destiny, reduced size, a simplified shape, and/or increased filling density can be achieved in a core part of an electric instrument.

20 Claims, 10 Drawing Sheets

METHOD OF MAKING A MAGNETIC CORE PART

BACKGROUND OF THE INVENTION (1) Technical Field

The present invention relates to a method of making a resin-molded magnetic core part for use in electronic instruments or electric instruments such as, for example, inductors, transformers, antennas (bar antennas), choke coils, filters, sensors, and the like.

(2) Background Art

In recent years, there is a growing tendency for an electronic or electric instrument to be reduced in size or increased in frequency or electric current and, hence, a core part is similarly required to respond to such tendency. However, ferrite material that is most frequently used has reached a limit in terms of material characteristics, and a new material is being sought. In some cases, ferrite material is replaced with a new material such as, for example, Sendust or amorphous foil strip. Although amorphous powder material superior in magnetic properties appears, it is inferior in moldability or compactibility to the conventional material, and the practical use thereof is accordingly limited.

In order to miniaturize the core part, a magnetic part (coil-embedded magnetic part) having a coil united with magnetic powder has been proposed. In making such a magnetic part, a green compact is first formed having electrode terminals that protrude outwardly from a side surface thereof. When the electrode terminals are then bent, there is a good chance that cracks may occur in the green compact around the portions from which the electrode terminals are led out or the green compact may break. In view of this, an improved coil-embedded magnetic part has been proposed having two or more terminals that protrude from a side surface of a powder compact, wherein recesses are formed in upper and lower surfaces of the green compact immediately above and below the leading positions of the terminals so as to be wider than the terminals. By so doing, the density of the compact around the leading portions of the terminals is increased, thereby preventing the occurrence of cracks or the breakage of the compact, which may be caused by the bending of the terminals (see, for example, Patent Document 1).

Further, in a method of making a rotor for a small motor that is provided with a rotary shaft and a permanent magnet united together by insert molding in which a resinous material is used, the productivity is increased using a resin containing a soft magnetic material during the insert molding (see, for example, Patent Document 2).

Another proposal has been offered wherein an integrated core is formed by first punching a lead frame having a carrier portion and terminal portions from a strip-shaped metal plate, subsequently bending ends of the terminal portions, and insert molding the lead frame with the use of ferrite resin with the terminal portions partly exposed (see, for example, Patent Document 3).

A further proposal has been also offered wherein the magnetic properties are enhanced by mixing permanent magnet pieces and an insulating material, compression molding a resulting mixture into a magnet, and inserting the magnet in a space defined in a magnetic core (see, for example, Patent Document 4).

Patent Document 1: Japanese Laid-Open Patent Publication No. 2003-309024

Patent Document 2: Japanese Laid-Open Patent Publication No. 10-257701

Patent Document 3: Japanese Laid-Open Patent Publication No. 5-315176

Patent Document 4: Japanese Laid-Open Patent Publication No. 50-133453

DISCLOSURE OF INVENTION

Problems to be Solved by the Invention

In the case of the powder compacting as disclosed in Patent Document 1, a large pressure is applied to the coil and, hence, short circuit may occur if the coil has insufficient insulation coating. Further, the coil insertion tends to cause uneven transmission of a pressure to respective particles that constitute the green compact. For this reason, not only is the shape limited, but cracks are also caused in some cases, when the outwardly protruding electrode terminals are being bent.

The method of making a rotor as disclosed in Patent Document 2 contributes to an increase in productivity, but the characteristics of the magnetic material is not improved, and the magnetic material is not insulated. Accordingly, there arises a problem in that the alternating current magnetic properties and, in particular, the direct current bias characteristics are not good.

The manufacturing method as disclosed in Patent Document 3 is free from the problem of cracks, unlike the insert molding united with the powder compacting, but only the use of a magnetic resin material lowers the magnetic flux density, compared with the green compact.

It is conceivable that the pressure to be applied to the green compact or the temperature during pressurized molding is increased to increase the filling density of the green compact, thereby preventing the occurrence of cracks. However, this leads to an increase in manufacturing cost and does not suit continuous mass production.

In the case of the compression-molded magnet as disclosed in Patent Document 4, the process of incorporating the magnet into the magnetic core is required, making it difficult to enhance the productivity. Further, the compact itself does not have a strength enough for handling thereof and, hence, there is a possibility of cracks occurring.

The present invention has been developed to overcome the above-described disadvantages.

It is accordingly an objective of the present invention to provide a method of making a compact and inexpensive magnetic core part that can have a variety of shapes or properties and is free from cracks, by increasing the filling density of a green compact, using a magnetic powder having a poor moldability.

Means to Solve the Problems

In accomplishing the above objective, the present invention provides a method of making a magnetic core part having predetermined magnetic properties by injection molding, and is characterized by coating with an insulating material magnetic powder contained in a resin composition for use in the injection molding, and by insert molding one of a soft magnetic green compact and a hard magnetic green compact into the resin composition.

It is preferred that the soft magnetic green compact or the hard magnetic green compact contains a binder having a melting point lower than an injection molding temperature.

Magnetic powder that is used for the soft magnetic green compact preferably contains magnetic particles having a diameter greater than that of magnetic powder particles in the resin composition.

The hard magnetic green compact preferably contains a thermosetting resin having a setting temperature lower than an injection molding temperature.

The soft magnetic green compact or the hard magnetic green compact may be at least partly crushed during the injection molding to form, together with the resin composition, the core part.

The magnetic core part may include a coil, and insert molding is carried out under a condition in which the soft magnetic green compact or the hard magnetic green compact has been inserted inside the coil.

Alternatively, insert molding is carried out under a condition in which the soft magnetic green compact or the hard magnetic green compact is disposed on each side of the coil in an axial direction thereof.

The present invention also provides a method of making a magnetic core part having predetermined magnetic properties by injection molding, and is characterized by: winding a wire around a bar to make a coil; pulling the coil out of the bar; curving an axial center of the coil so as to present a generally circular shape to thereby form a toroidal air-core; and insert molding the toroidal air-core into a resin composition containing magnetic powder coated with an insulating material.

A wire- or foil-shaped material having a permeability higher than that of the resin composition may be arranged within the coil so as to extend along the generally circularly curved axial center thereof and insert molded into the resin composition.

Effects of the Invention

The present invention of the construction referred to above offers the following effects.

According to the present invention, because the soft magnetic green compact is insert molded into the resin composition, the magnetic flux density can be increased, compared with ordinary injection molded products, by positioning the soft magnetic green compact at a portion where an increase in magnetic flux density is desired, making it possible to reduce the size of the magnetic core part. Also, because the shape of the compact can be simplified, not only can the filling density be increased, but cracks that have been hitherto caused, for example, during bending of the electrode terminals can be also prevented. Further, if the hard magnetic green compact is positioned at a portion of a magnetic path, it provides the magnetic core part with a magnetic bias and, hence, the magnetic core part is hardly saturated even in a high magnetic field.

In addition, because the soft magnetic green compact or the hard magnetic green compact contains a binder having a melting point lower than the injection molding temperature, melting or softening of the binder in the soft or hard magnetic green compact occurs during the injection molding and, at the same time, an injection pressure is applied thereto, resulting in a status similar to the warm pressurization. Accordingly, compression progresses to improve the magnetic properties of the soft or hard magnetic green compact.

In the case where the hart magnetic green compact contains a thermosetting resin having a setting temperature lower than the injection molding temperature, hardening of the thermosetting resin commences during the injection molding. As a result, the density of the hard magnetic green compact increases to thereby avoid the generation of cracks that has been hitherto caused concurrently with improvement in magnetic properties or increase in strength.

If the soft or hard magnetic green compact is at least partly crushed during the injection molding, voids existing therein are released in the course of collapse of the soft or hard magnetic green compact, thereby improving the filling density of the entire compact and homogenizing it as compared with the case wherein the shape of the soft or hard magnetic green compact is left unchanged. If the collapse of the soft or hard magnetic green compact is caused locally, for example, at an end surface of the magnetic core part, an abrupt change in magnetic properties due to the presence or absence of the soft or hard magnetic green compact can be relieved.

Moreover, because the soft or hard magnetic green compact is insert molded together with a coil, the manufacturing process of the magnetic core part can be simplified. Also, the magnetic flux density can be partially increased or a magnetic bias can be effectively given by appropriately selecting the positional relationship between the coil and the soft magnetic green compact or the hard magnetic green compact and, accordingly, the size such as the coil diameter, the number of turns, or the height of the entire magnetic core part including the coil can be reduced as occasion demands. Further, because the resin composition protects the soft magnetic green compact or the hard magnetic green compact, there is no fear of cracks occurring that may be caused during the bending of the electrode terminals in association solely with the soft or hard magnetic green compact.

If at least one of a coil, an amorphous foil strip, a soft magnetic green compact and a hard magnetic green compact is insert molded in the resin composition, the shape of the magnetic core part is simplified and the limitation in terms of the shape is reduced. In particular, if the shape of the soft or hard magnetic green compact is simplified, the structure of a molding die assembly can be also simplified, making it possible to lengthen the life of the die assembly and increase the molding speed.

DETAILED DESCRIPTION OF THE INVENTION

Embodiments of the present invention are explained hereinafter with reference to the drawings.

Embodiment 1

Figure 1:
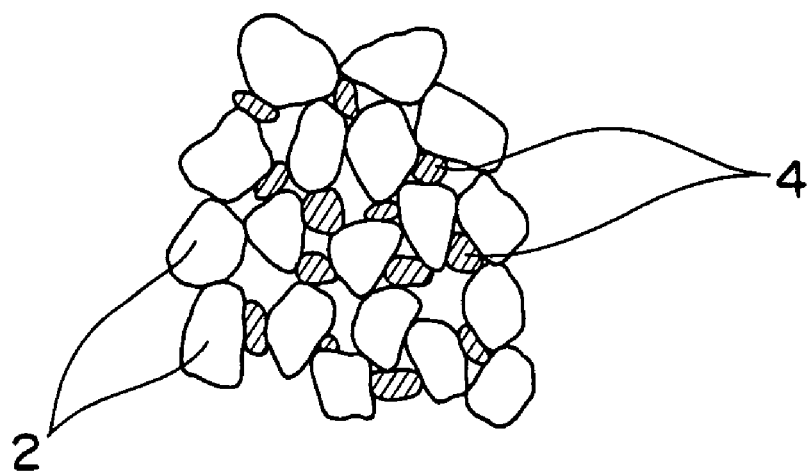
FIG. 1 is a schematic view of a soft magnetic green compact that is used in a method of making a resin-molded magnetic core part according to a first embodiment of the present invention.

FIG. 1 depicts a magnetic substance, in which powder particles have been compacted, for use in a method of making a resin-molded magnetic core part according to a first embodiment of the present invention. This magnetic substance includes a large number of powder particles 2 constituting magnetic powder and each coated with an insulating material, and a large number of binder particles 4 interposed (dispersed) between the powder particles 2.

Figure 2:
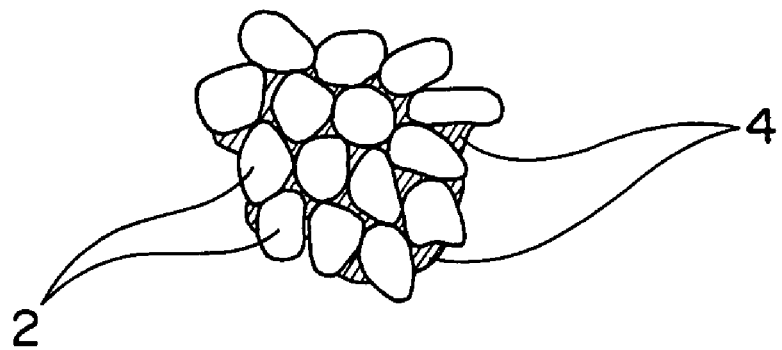
FIG. 2 is a schematic view of the soft magnetic green compact of FIG. 1 after injection molding.

A resin having a melting temperature lower than a predetermined injection molding temperature is used as the binder 4. The binder 4 is fused or softened by injection molding it at a predetermined temperature with a base resin containing magnetic powder coated with the insulating material. As shown in FIG. 2, the intervals between the magnetic powder particles 2 are shortened, and the compacted magnetic substance shrinks, resulting in an increase in the filling density.

Preferably, examples of the magnetic powder particles 2 include the following materials excellent in soft magnetic properties:

Pure iron-based soft magnetic materials such as metal powder and iron nitride powder, Iron alloy-based soft magnetic materials such as Fe—Si—Al alloy (Sendust) powder, Super Sendust powder, Ni—Fe alloy (Permalloy) powder, Co—Fe alloy powder, pure iron-based soft magnetic materials, and Fe—Si—B-based alloy powder, Ferrite-based materials, Amorphous materials, and Microcrystal materials.

The following thermoplastic resins can be used as the binder 4 used for the powder compression molding:

Polyolefin such as polyethylene and polypropylene,

Polyvinyl alcohol, polyethylene oxide, PPS, liquid crystal polymer, PEEK, polyimide, polyetherimide; polyacetal, polyethersulfone, polysulfone, polycarbonate, polyethylene terephthalate, polybutylene terephthalate, polyphenylene oxide, polyphthalamide, polyamide, etc., and Mixtures of the above-mentioned resins.

Further, the following materials can be used as an insulating material for coating the magnetic powder particles 2 or an insulating material for coating the magnetic powder of the base resin:

Insulating metal or semi-metal oxides such as $Al_2O_3$, $Y_2O_3$, MgO and $ZrO_2$, Glass materials, and Mixtures thereof.

The base resin for use in the injection molding is not particularly limited if it can be used in ordinary injection molding. It may be the same as or different from the resin that is used for the binder 4. In order to compress the powder compact during the injection molding, it is preferred that the resin to be used as the binder 4 has a melting point lower than the injection molding temperature by 30° C., but a large difference brings about a bad effect such as, for example, decomposition of the binder 4.

It is not always necessary for the soft magnetic green compact to contain the binder 4. Even in the case where the soft magnetic green compact is merely insert molded into the base resin, the magnetic flux density can be increased, compared with ordinary injection molded products, by positioning the soft magnetic green compact at a portion where an increase in magnetic flux density is desired, making it possible to reduce the size of the magnetic core part. Also, because the shape of the soft magnetic green compact can be simplified, not only can the filling density be increased, but cracks that have been hitherto caused, for example, during bending of the electrode terminals can be also prevented.

Figure 3:
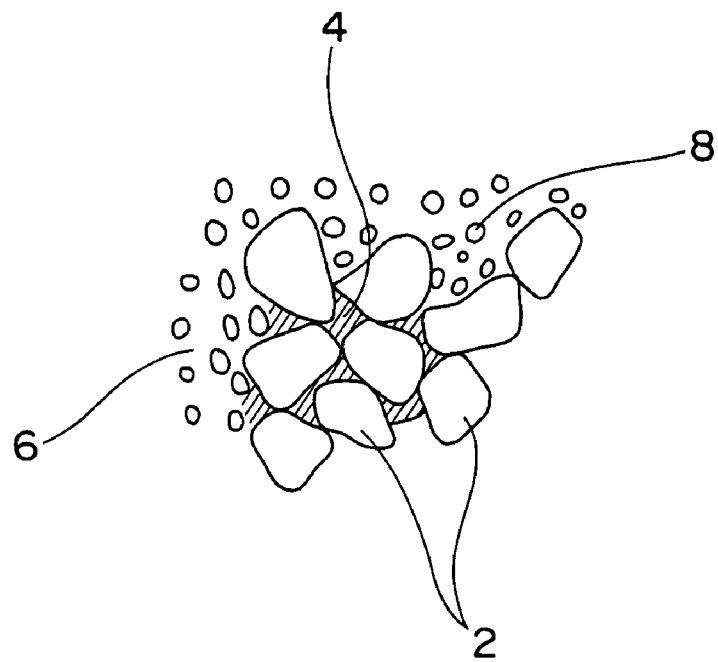
FIG. 3 is a schematic view of a modified form of the soft magnetic green compact of FIG. 1 after the injection molding.

It is preferred that the magnetic powder particles 2 to be used for the soft magnetic green compact referred to above have a diameter greater than that of the insulated magnetic powder particles contained in the base resin composition. FIG. 3 depicts such soft magnetic green compact during injection molding.

As shown in FIG. 3, the binder 4 melts during the injection molding to thereby increase the filling density of the soft magnetic green compact, but if the diameter of the magnetic powder particles 2 to be used for the soft magnetic green compact is greater than that of the magnetic powder particles 8 in the resin composition 6, the magnetic powder particles 8 gain entry into spaces existing in proximity to the surface of the soft magnetic green compact, thereby enhancing continuity as a magnetic substance.

It is also preferred that the average diameter of the magnetic powder particles 2 to be used for the soft magnetic green compact be about 1.5 to 3 times greater than that of the magnetic powder particles 8 in the resin composition 6. Theoretically, this particle diameter ratio may be further increased, but depending on the combination of the magnetic powder particles, a problem may arise when powder compacting or injection molding is carried out.

Figure 4:
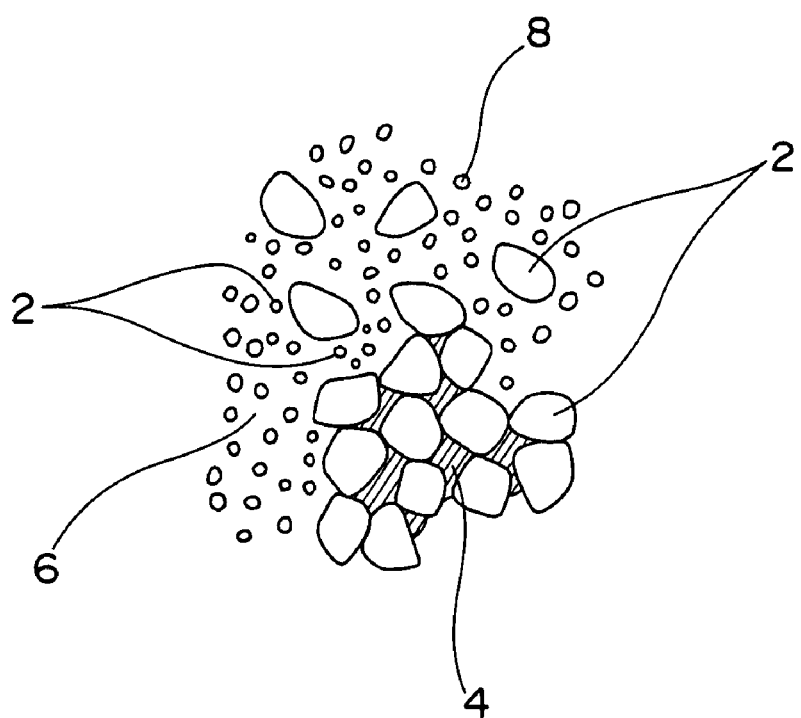
FIG. 4 is a schematic view of another modified form of the soft magnetic green compact of FIG. 1 after the injection molding.

Moreover, if the soft magnetic green compact has an edged shape (for example, a shape having large burrs) or low-density portions, or if a less amount of binder 4 is used as compared with the magnetic powder 2, the magnetic powder particles 2 are at least partly crushed by a pressure caused by a flow during the injection molding, as shown in FIG. 4, and form, together with the base resin composition, the core part, thereby substantially increasing the amount of filling of the magnetic substance in the resin composition.

FIGS. 5A and 5B and FIGS. 6A and 6B depict a toroidal core and an E core, respectively, both made by the method of making a resin-molded magnetic core part according to this embodiment of the present invention. Each of them is used for inductors, transformers, choke coils, filters, and the like that are superior in magnetic properties (or that have predetermined magnetic properties).

Figure 5A:
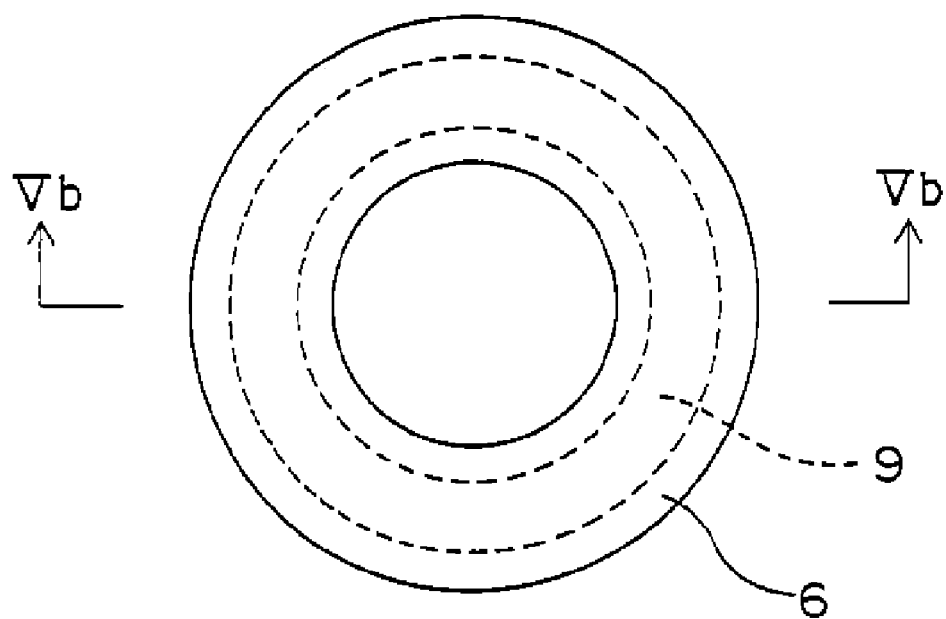
FIG. 5A is a top plan view of a toroidal core made by the method of making a resin-molded magnetic core part according to the first embodiment of the present invention.
Figure 5B:
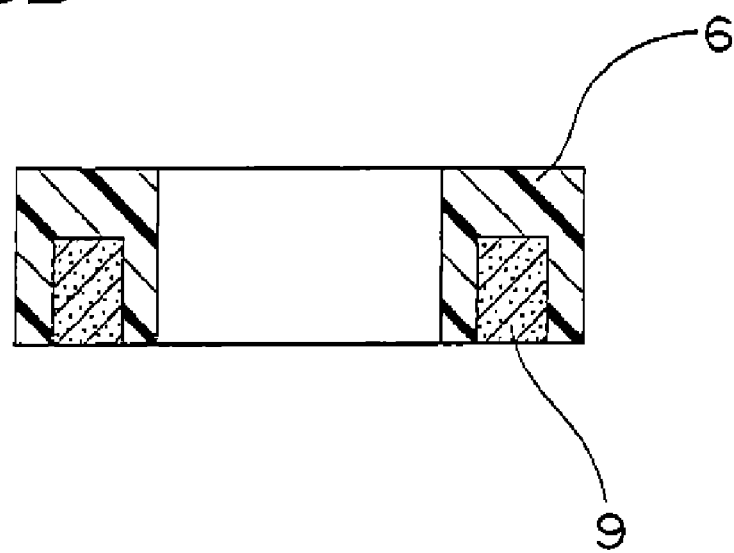
FIG. 5B is a sectional view taken along line Vb-Vb in FIG. 5A.
Figure 6A:
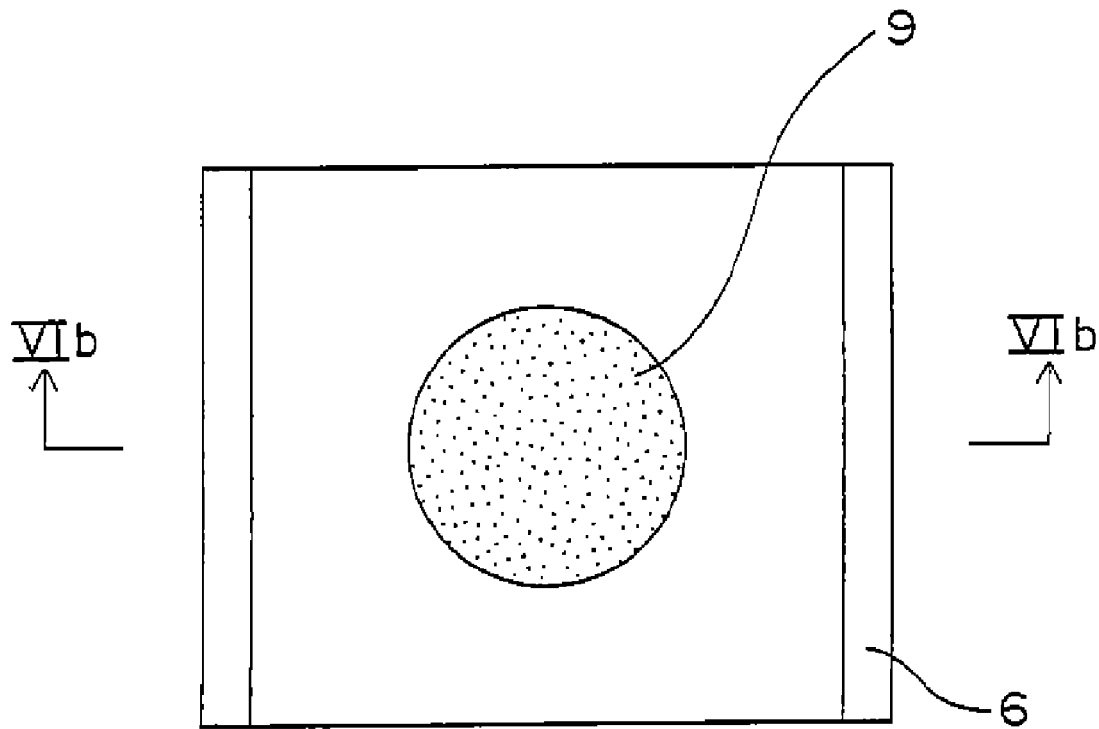
FIG. 6A is a top plan view of an E core made by the method of making a resin-molded magnetic core part according to the first embodiment of the present invention.
Figure 6B:
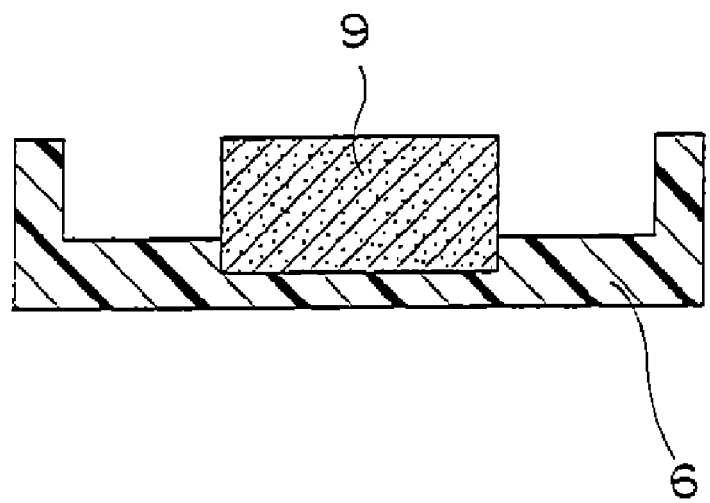
FIG. 6B is a sectional view taken along line VIb-VIb in FIG. 6A.

The toroidal core as shown in FIGS. 5A and 5B includes a ring-shaped green compact 9 that has been insert molded into a resin composition 6, while the E core as shown in FIGS. 6A and 6B includes a green compact 9 that has been insert molded into a resin composition 6 at a central portion thereof.

Embodiment 2

Figure 7A:
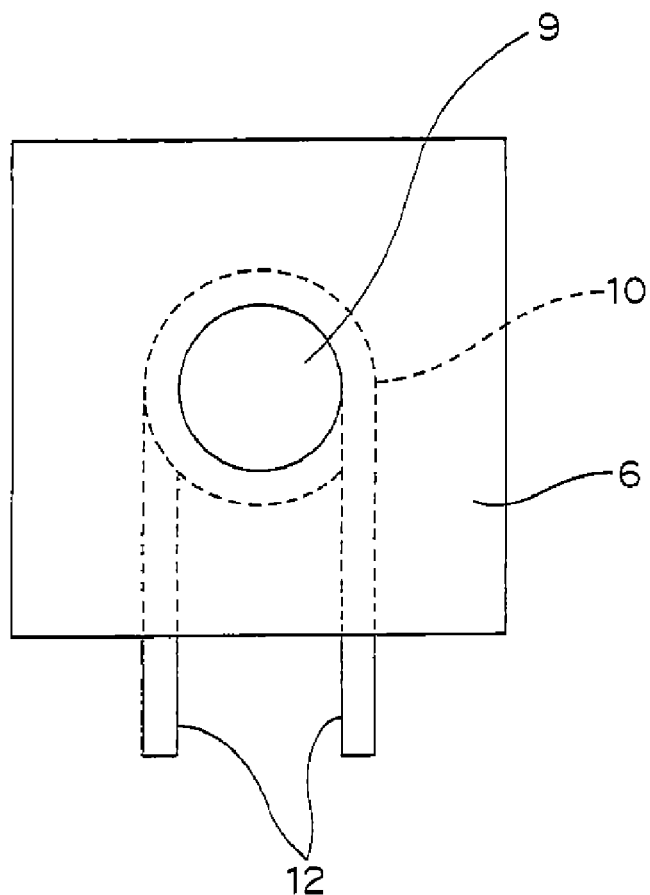
FIG. 7A is a top plan view of a magnetic core part made by a method of making a resin-molded magnetic core part according to a second embodiment of the present invention.
Figure 7B:
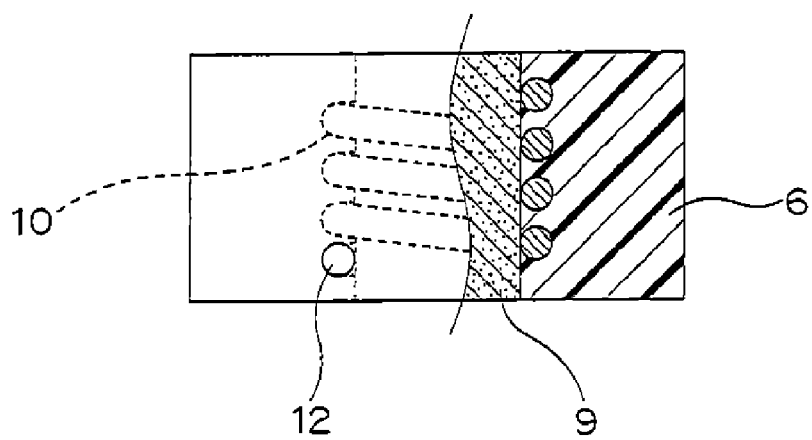
FIG. 7B is a partial sectional view of the magnetic core part of FIG. 7A.

FIGS. 7A and 7B depict a magnetic core part made by a method of making a resin-molded magnetic core part according to a second embodiment of the present invention, wherein the magnetic core part is a coil-embedded magnetic part.

As shown in FIGS. 7A and 7B, under the condition in which opposite leading portions 12 of a coil 10 are caused to extend outwardly in the same direction in parallel to each other, a soft magnetic green compact 9 is first inserted inside the coil 10, and both of them are then insert molded into a resin composition 6 with only the opposite leading portions 12 exposed. By so doing, the permeability of the resin-molded magnetic core part is partially enhanced, thereby improving the performance thereof. In particular, if the soft magnetic green compact 9 is inserted inside the coil 10, the permeability on the inner side of the coil 10 is enhanced and, hence, not only can the coil diameter be reduced, but the number of turns can be also reduced.

Figure 8A:
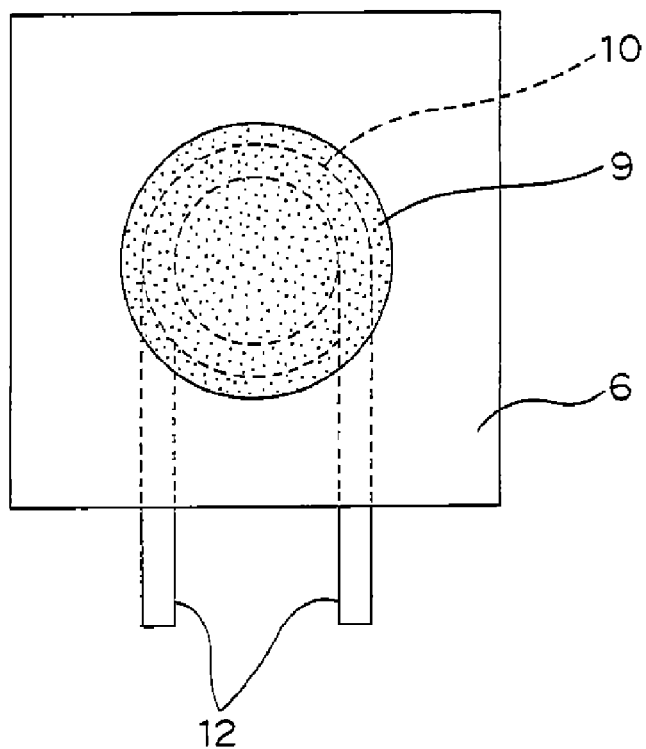
FIG. 8A is a top plan view of a modified form of the magnetic core part of FIG. 7A.
Figure 8B:
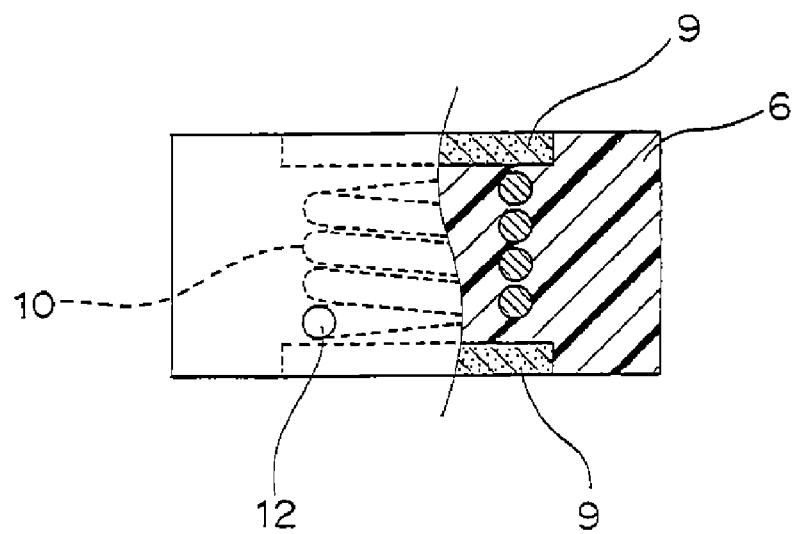
FIG. 8B is a partial sectional view of the magnetic core part of FIG. 8A.

As shown in FIGS. 8A and 8B, a soft magnetic green compact 9 having a high permeability is disposed on each side of the coil 10 in the axial direction thereof, and both of them are insert molded into a resin composition 6 with only the opposite leading portions 12 exposed. By so doing, the permeability on the opposite sides of the coil 10 in the axial direction thereof is partially enhanced, making it possible to reduce the height of the entire core (coil).

Embodiment 3

Figure 9A:
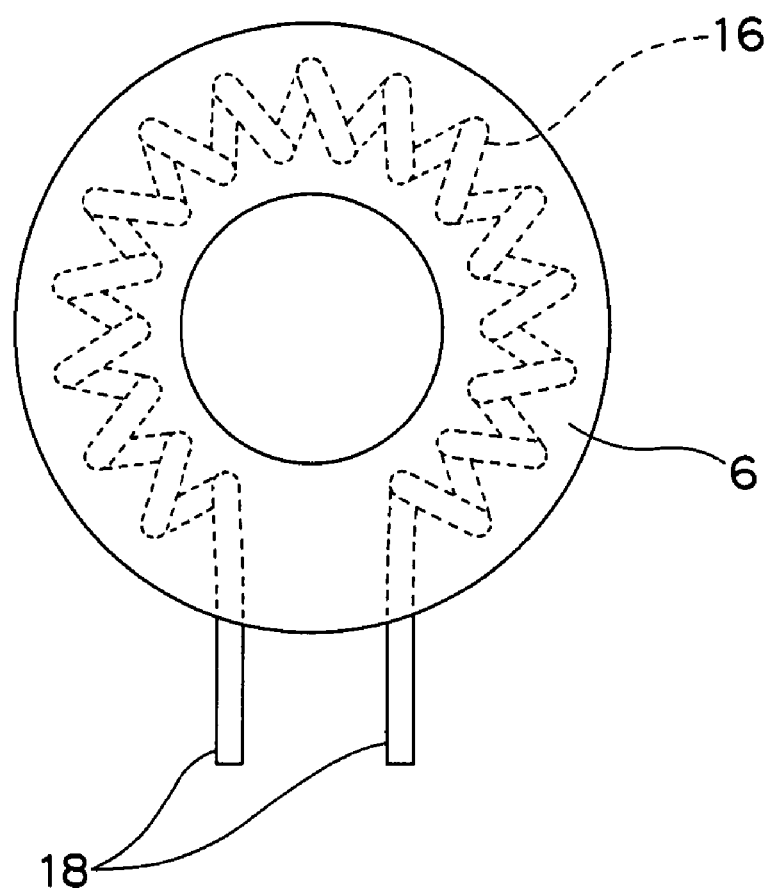
FIG. 9A is a top plan view of a magnetic core part made by a method of making a resin-molded magnetic core part according to a third embodiment of the present invention.
Figure 9B:
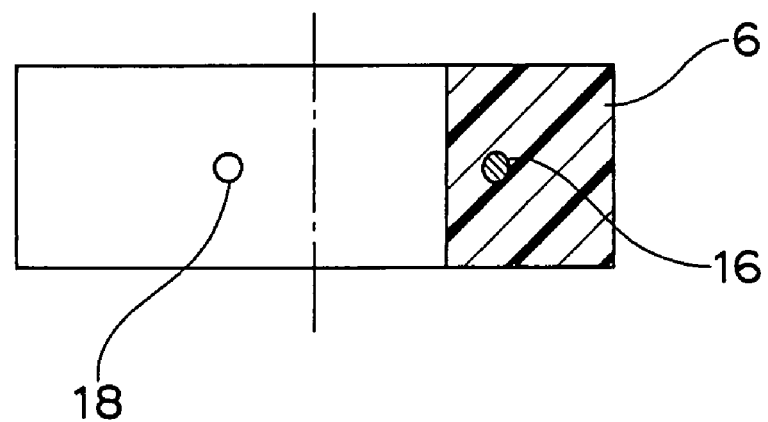
FIG. 9B is a partial sectional view of the magnetic core part of FIG. 9A.

FIGS. 9A and 9B depict a magnetic core part made by a method of making a resin-molded magnetic core part according to a third embodiment of the present invention, particularly depicting the case where the resin-molded magnetic core part is a coil-embedded magnetic part.

In the case of the resin-molded magnetic core part as shown in FIGS. 9A and 9B, a wire made of an electrically conductive material such as, for example, Cu is first wound around a generally straight bar (not shown) to form a coil 16, which is in turn pulled out of the bar and then curved so that the axial center of the coil 16 may present a generally circular shape with opposite leading portions 18 thereof led out in the same direction in parallel to each other. Thereafter, the curved coil 16 is insert molded into a resin composition 6 with only the opposite leading portions 18 exposed. This process makes it possible to considerably simply complete a toroidal core integrated with an air-core coil, as compared with the conventional process.

Figure 10A:
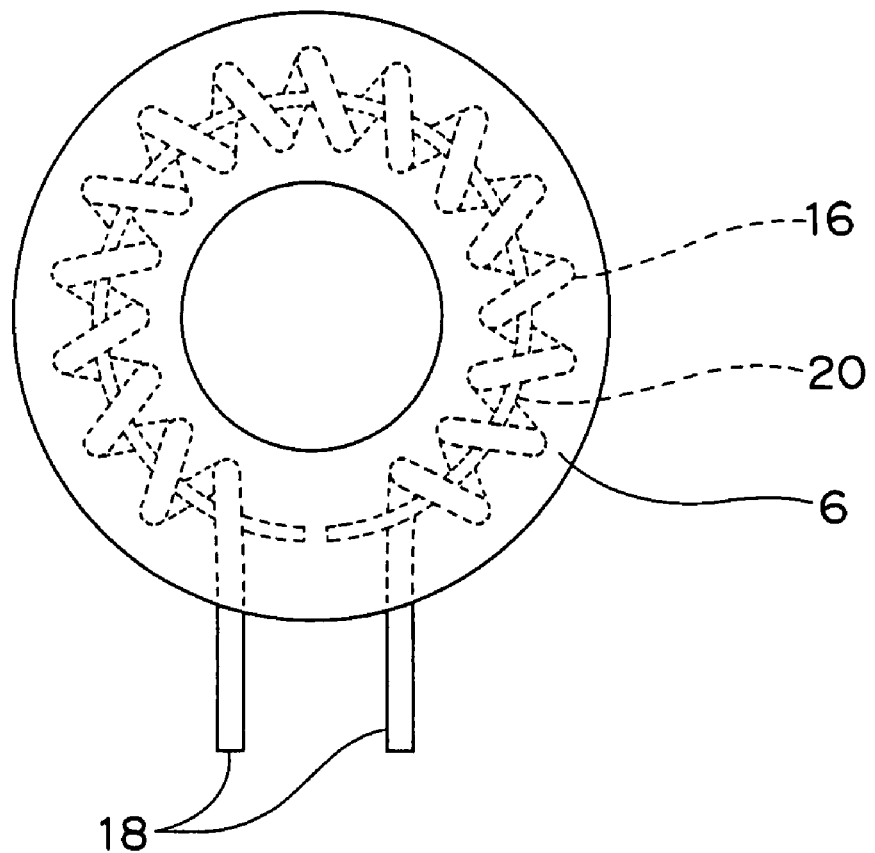
FIG. 10A is a top plan view of a modified form of the magnetic core part of FIG. 9A.
Figure 10B:
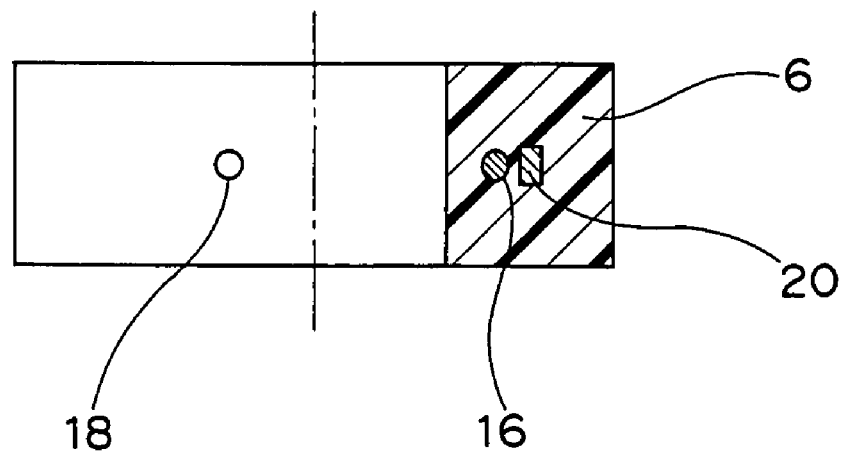
FIG. 10B is a partial sectional view of the magnetic core part of FIG. 10A.

FIGS. 10A and 10B depict a modified form of the resin-molded magnetic core part (toroidal core integrated with an air-core coil) as shown in FIGS. 9A and 9B. This resin-molded magnetic core part differs from that shown in FIGS. 9A and 9B in that a wire- or foil-shaped high-permeability material 20 having a permeability higher than that of the resin composition 6 is arranged within the coil 16 so as to extend along the generally circularly curved axial center thereof and insert molded with only the opposite leading portions 18 exposed.

The arrangement of the high-permeability material 20 along the axial center of the coil 16 referred to above makes it possible to easily make a resin-molded magnetic core part that is difficult to make with the use of only a powder compact. An amorphous foil strip or the like is preferably used as the high-permeability material.

Embodiment 4

FIGS. 11A and 11B and FIGS. 12A and 12B depict a toroidal core and an E core, respectively, both made by a method of making a resin-molded magnetic core part according to a fourth embodiment of the present invention. Each of them is used for inductors, transformers, choke coils, filters, and the like that are superior in magnetic properties (or that have predetermined magnetic properties).

Figure 11A:
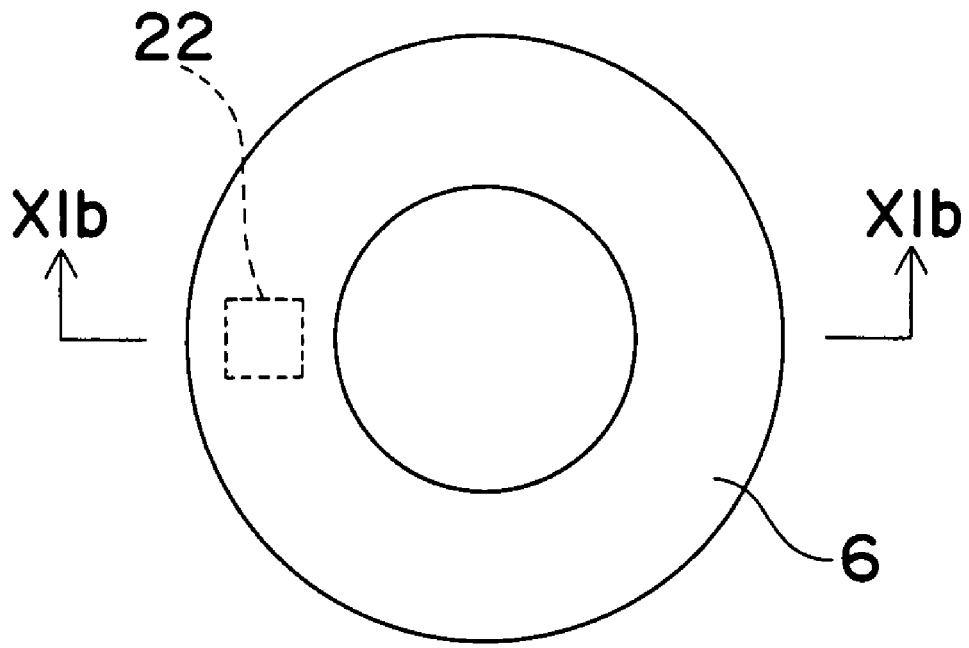
FIG. 11A is a top plan view of a toroidal core made by a method of making a resin-molded magnetic core part according to a fourth embodiment of the present invention.
Figure 11B:
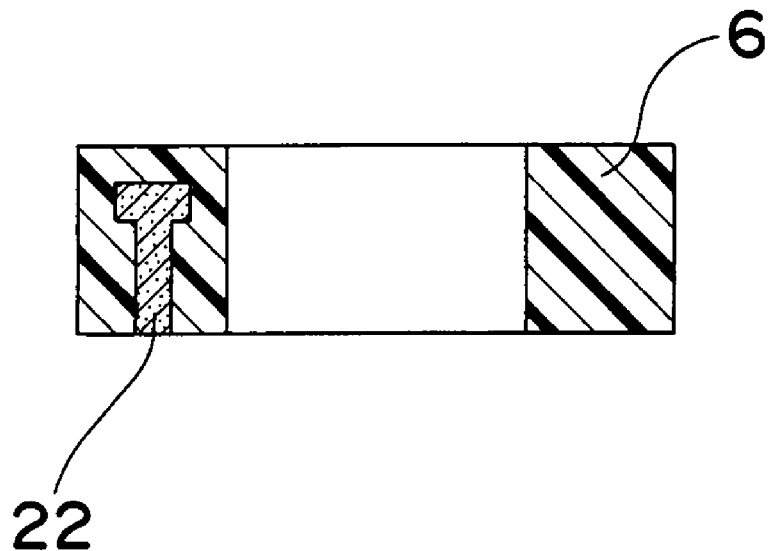
FIG. 11B is a sectional view taken along line XIb-XIb in FIG. 11A.
Figure 12A:
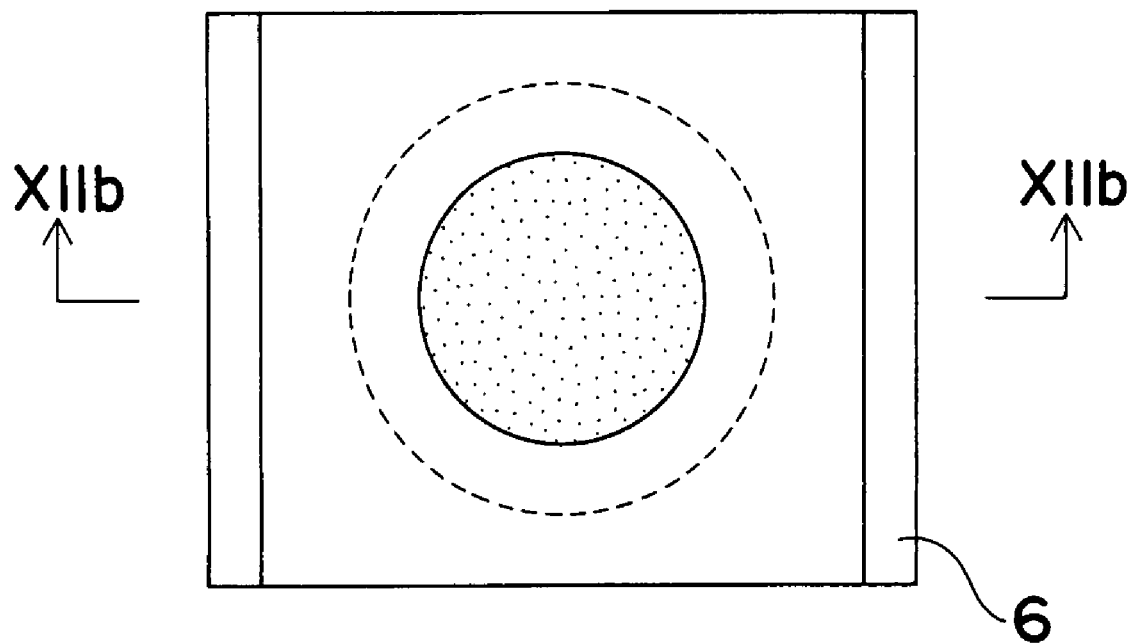
FIG. 12A is a top plan view of an E core made by the method of making a resin-molded magnetic core part according to the fourth embodiment of the present invention.
Figure 12B:
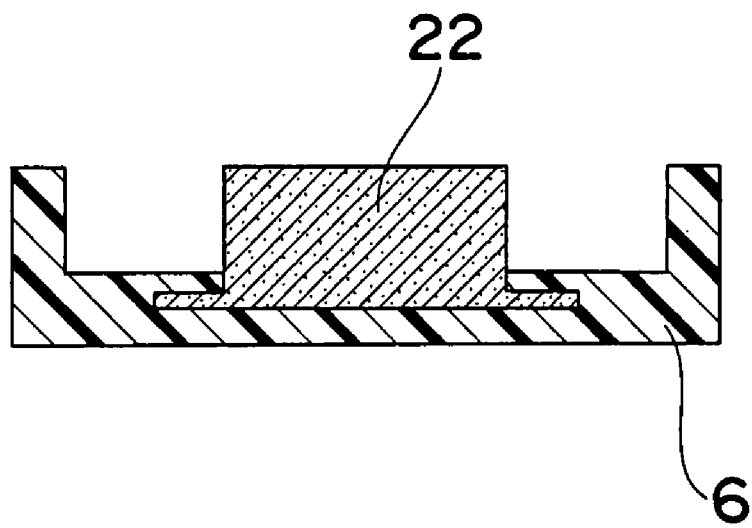
FIG. 12B is a sectional view taken along line XIIb-XIIb in FIG. 12A.

The toroidal core as shown in FIGS. 11A and 11B includes a hard magnetic green compact 22 having a T-shaped cross section that has been insert molded into a portion of a resin composition 6, while the E core as shown in FIGS. 12A and 12B includes a hard magnetic green compact 22 having an inverted T-shaped cross section that has been insert molded into a resin composition 6 at a central portion thereof.

The embodiment shown in FIGS. 5A and 5B or FIGS. 6A and 6B differs from this embodiment in that in the former a soft magnetic green compact 9 is insert molded into a resin composition, while in the latter a hard magnetic green compact or powder magnet compact 22 is insert molded into a resin composition. The hard magnetic green compact 22 can replace the soft magnetic green compact 9 in the magnetic core part shown in FIGS. 7A and 7B or FIGS. 8A and 8B. In this event, the magnetic properties are effectively enhanced if the hard magnetic green compact 22 is magnetized so as to cancel a magnetic field created by the coil 10.

In the first to third embodiments referred to above, as shown in FIG. 1, a large number of binder particles 4 are interposed between a large number of powder particles 2 constituting magnetic powder and each coated with an insulating material, while in the hard magnetic green compact 22 that is used in this embodiment, a large number of binder particles are interposed between a large number of magnet powder particles each coated with an insulating material to thereby increase the density of filling of the hard magnetic green compact.

As the magnet powder particles, hard magnetic materials such as Ferrite-based magnet power or rare-earth magnet powder such as Fe—Nd—B-based magnet powder are preferably used, and amorphous materials or microcrystal materials can be used.

When a thermoplastic resin is used as the binder 4 during powder compression molding, the following thermoplastic resins can be used:

Polyolefin such as polyethylene and polypropylene,

Polyvinyl alcohol, polyethylene oxide, PPS, liquid crystal polymer, PEEK, polyimide, polyetherimide; polyacetal, polyethersulfone, polysulfone, polycarbonate, polyethylene terephthalate, polybutylene terephthalate, polyphenylene oxide, polyphthalamide, polyamide, etc., and Mixtures of the above-mentioned resins.

Further, when a thermosetting resin is used as the binder 4, resins such as, for example, phenol, polyimide, urea, melamine, epoxy, etc. can be used.

Other conditions such as the temperature conditions in this embodiment are substantially the same as those in the first to third embodiments. However, the continuity as a magnetic substance is enhanced by making the diameter of the magnetic powder particles 2 for use in the soft magnetic green compact greater than that of the magnetic powder particles 8 in the resin composition 6, while in this embodiment a hard magnetic material is used as the magnetic powder particles 2, and because the enhancement in continuity as a magnetic substance does not have any sense, it is not necessary for the magnet powder particles to have a diameter greater than that of the magnetic powder particles 8.

Also, in this embodiment, it is preferred that the hard magnetic green compact 22 contains a thermosetting resin having a setting temperature lower than an injection molding temperature. During the injection molding, the hard magnetic green compact 22 shrinks and then hardens to increase the density of the hard magnetic green compact, thereby improving the magnetic properties and preventing cracks from occurring.

INDUSTRIAL APPLICABILITY

Because the method of making a magnetic core part according to the present invention can increase the density of filling of a resin-molded magnetic core part, it is suitable for mass production of small and inexpensive magnetic core parts and is accordingly effectively utilized to make electronic or electric instruments such as, for example, inductors, transformers, antennas (bar antennas), choke coils, filters, or sensors.

The invention claimed is:

1. A method of making a magnetic core part having predetermined magnetic properties, comprising:
    coating a first magnetic powder with an insulating material;
    preparing a resin composition for use in injection molding;
    incorporating the first magnetic powder coated with insulating material into the resin composition such that the first magnetic powder coated with insulating material is contained in the resin composition;
    insert molding a magnetic green compact into the resin composition.

2. The method of making the magnetic core part according to claim 1,
    wherein said insert molding operation includes injection molding the resin composition at an injection molding temperature,
    wherein said magnetic green compact contains a binder having a melting point lower than the injection molding temperature.

3. The method of making the magnetic core part according to claim 1,
    wherein the magnetic green compact is a soft magnetic green compact,
    wherein a second magnetic powder is present in the soft magnetic green compact,
    wherein the first magnetic powder contains magnetic particles, and
    wherein the second magnetic powder contains magnetic particles having a diameter greater than that of the magnetic powder particles of the first magnetic powder.

4. The method of making the magnetic core part according to claim 1,
    wherein said insert molding operation includes injection molding the resin composition at an injection molding temperature,
    wherein the magnetic green compact is a hard magnetic green compact, and
    wherein the hard magnetic green compact contains a thermosetting resin having a curing temperature lower than the injection molding temperature.

5. The method of making the magnetic core part according to claim 1,
    wherein the magnetic green compact is at least partly crushed during said insert molding operation to form, together with the resin composition, the magnetic core part.

6. The method of making the magnetic core part according to claim 1,
    wherein the magnetic core part comprises a coil, and
    wherein the method further comprises inserting the magnetic green compact inside the coil before said insert molding operation is performed.

7. The method of making the magnetic core part according to claim 1,
    wherein the magnetic core part comprises a coil, and
    wherein the method further comprises inserting the magnetic green compact inside the coil before said insert molding operation is performed.

8. A method of making a magnetic core part having predetermined magnetic properties, comprising:
    winding a wire around a bar to make a coil;
    pulling the coil off of the bar;
    curving the coil such that an axial center of the coil has a generally circular shape to form a toroidal air-core; and
    insert molding the toroidal air-core into a resin composition containing magnetic powder coated with an insulating material.

9. The method of making the magnetic core part according to claim 8,
    wherein a wire-shaped or foil-shaped material having a permeability higher than that of the resin composition is arranged within the coil so as to extend along the generally circular axial center of coil, and
    wherein said insert molding operation includes insert molding the coil with the wire-shaped or foil-shaped material being arranged within the coil.

10. The method of making the magnetic core part according to claim 1,
    wherein the magnetic green compact constitutes one of a soft magnetic green compact and a hard magnetic green compact.

11. The method of making the magnetic core part according to claim 10,
    wherein said insert molding operation includes injection molding the resin composition at an injection molding temperature,
    wherein said magnetic green compact contains a binder having a melting point lower than the injection molding temperature.

12. The method of making the magnetic core part according to claim 10,
    wherein the magnetic green compact is a soft magnetic green compact,
    wherein a second magnetic powder is present in the soft magnetic green compact,
    wherein the first magnetic powder contains magnetic particles, and
    wherein the second magnetic powder contains magnetic particles having a diameter greater than that of the magnetic powder particles of the first magnetic powder.

13. The method of making the magnetic core part according to claim 10,
    wherein said insert molding operation includes injection molding the resin composition at an injection molding temperature,
    wherein the magnetic green compact is a hard magnetic green compact, and wherein the hard magnetic green compact contains a thermosetting resin having a curing temperature lower than the injection molding temperature.

14. The method of making the magnetic core part according to claim 10,
wherein the magnetic green compact is at least partly crushed during said insert molding operation to form, together with the resin composition, the magnetic core part.

15. The method of making the magnetic core part according to claim 10,
wherein the magnetic core part comprises a coil, and
wherein the method further comprises inserting the magnetic green compact inside the coil before said insert molding operation is performed.

16. The method of making the magnetic core part according to claim 10,
wherein the magnetic core part comprises a coil, and
wherein the method further comprises inserting the magnetic green compact inside the coil before said insert molding operation is performed.

17. The method of making the magnetic core part according to claim 10,
wherein said insert molding operation includes injection molding the resin composition at an injection molding temperature,
wherein said magnetic green compact contains a binder having a melting point lower than the injection molding temperature by at least 30° C.

18. The method of making the magnetic core part according to claim 10,
wherein the magnetic green compact is a soft magnetic green compact,
wherein a second magnetic powder is present in the soft magnetic green compact,
wherein the first magnetic powder contains magnetic particles, and
wherein the second magnetic powder contains magnetic particles having a diameter 1.5 to 3 times greater than that of the magnetic powder particles of the first magnetic powder.

19. The method of making the magnetic core part according to claim 1,
wherein said insert molding operation includes injection molding the resin composition at an injection molding temperature,
wherein said magnetic green compact contains a binder having a melting point lower than the injection molding temperature by at least 30° C.

20. The method of making the magnetic core part according to claim 1,
wherein the magnetic green compact is a soft magnetic green compact,
wherein a second magnetic powder is present in the soft magnetic green compact,
wherein the first magnetic powder contains magnetic particles, and
wherein the second magnetic powder contains magnetic particles having a diameter 1.5 to 3 times greater than that of the magnetic powder particles of the first magnetic powder.

* * * * *